US007650464B2

United States Patent
Liu et al.

(10) Patent No.: US 7,650,464 B2
(45) Date of Patent: Jan. 19, 2010

(54) OBJECT RELOCATION GUIDED BY DATA CACHE MISS PROFILE

(75) Inventors: Jack Liu, San Jose, CA (US); Dong-Yuan Chen, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 479 days.

(21) Appl. No.: 11/728,383

(22) Filed: Mar. 26, 2007

(65) Prior Publication Data
US 2008/0243300 A1    Oct. 2, 2008

(51) Int. Cl.
*G06F 12/00* (2006.01)
(52) U.S. Cl. .................. 711/118; 711/144; 711/156; 711/158; 711/165; 707/206; 718/104; 718/105
(58) Field of Classification Search .................. 711/118, 711/144, 156, 158, 165; 707/206; 718/104, 718/105
See application file for complete search history.

(56) References Cited

U.S. PATENT DOCUMENTS

| 7,343,598 | B2 * | 3/2008 | Chilimbi et al. ............ 717/158 |
| 7,424,705 | B2 * | 9/2008 | Lewis et al. ................. 717/148 |
| 2007/0156967 | A1 * | 7/2007 | Bond et al. ................. 711/137 |
| 2008/0168249 | A1 * | 7/2008 | Hirzel et al. ................ 711/170 |

\* cited by examiner

*Primary Examiner*—Stephen C Elmore
(74) *Attorney, Agent, or Firm*—Trop, Pruner & Hu, P.C.

(57) ABSTRACT

Data locality optimization through object relocation may be implemented in a virtual machine including a just-in-time compiler. The just-in-time compiler generates load instruction maps for each compiled method. A profile collector is coupled to the just-in-time compiler to receive hardware profiling support. The profile collector takes samples of data cache misses. A garbage collector is coupled to the profile collector. The garbage collector deduces types of objects from the cache miss samples and adjusts garbage collection object copying heuristics to relocate objects for better cache locality based on those types.

14 Claims, 1 Drawing Sheet

OBJECT RELOCATION GUIDED BY DATA CACHE MISS PROFILE

BACKGROUND

This relates generally to processor-based systems and, particularly, to systems that use data caching.

Data caching involves storing frequently accessed data in a memory which can be rapidly accessed when the data is accessed. It may improve access time by holding the data in a location from which it may be more readily accessed.

DETAILED DESCRIPTION

In some embodiments, a dynamic optimization mechanism relocates objects during garbage collection to improve an application's memory locality and, hence, achieve better performance. The mechanism may utilize a data cache miss profile collected through a microprocessor's performance monitoring unit (PMU) or special hardware profiling support. A software object layout optimizer then processes the data cache miss profile, automatically identifying the types of objects that cause most of the cache misses at run time. The objects identified to cause the most cache misses are called "delinquent objects" and their types are called "delinquent types." The optimizer continuously monitors the data cache miss profile, building up affiliation knowledge between delinquent types, and dynamically adjusts the object copying heuristics during the copying phase of a generational garbage collector to achieve better data locality.

Figure 1:
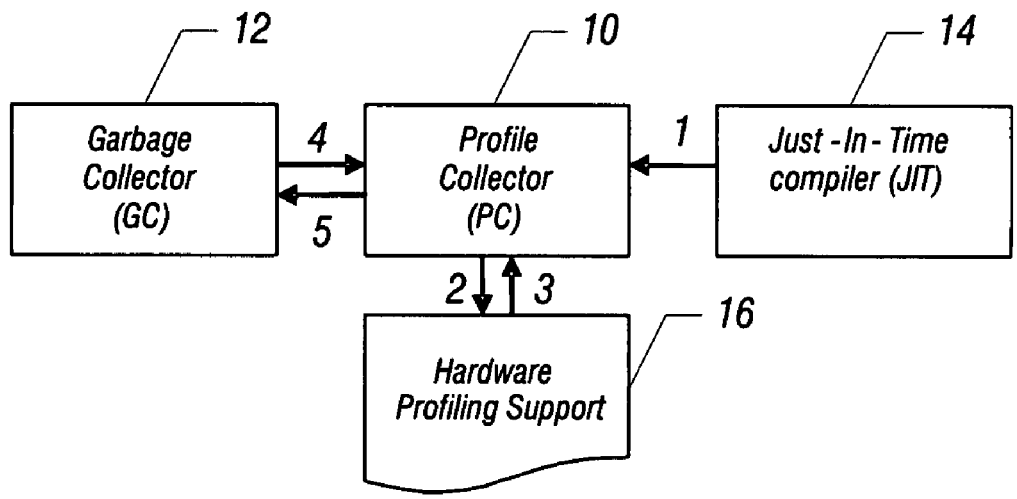
FIG. 1 is a high level software and hardware depiction in accordance with one embodiment of the present invention.

The software object optimizer involves the collaboration of three components. A profile collector (PC) 10, a just-in-time (JIT) compiler 14, and a generational garbage collector (GC) 12 work together as illustrated in FIG. 1. The profile collector 10 interfaces with the processor's hardware profiling support 16, such as the hardware performance monitoring unit, to monitor data cache miss events during program execution.

Figure 2:
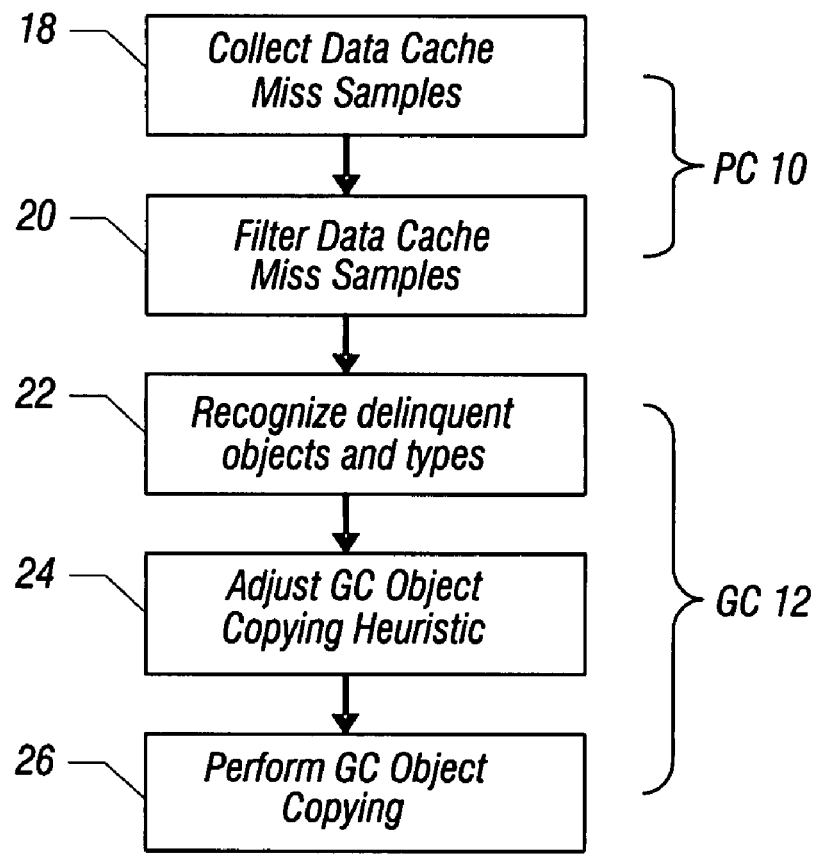
FIG. 2 is a flow chart for a sequence in accordance with one embodiment of the present invention.

The profile collector 10 configures hardware and takes samples of the data cache misses as indicated in FIG. 2, block 18. Each sample includes an instruction pointer address, pointing to the load instruction that misses the data cache, and the address of the memory location targeted by the load instruction. The just-in-time compiler 14 generates a load instruction map for each method it has compiled. The load instruction map is used to translate the instruction pointer address in the raw data cache miss samples into objects and object types (block 20). The garbage collector 12 takes the data cache miss samples and the load instruction maps, processes them, and extracts the delinquent types and affiliation relationship between delinquent types (block 22). It then uses the delinquent type affiliation to dynamically adjust object copying heuristics (block 24). Thus, the profile collector 10 interfaces with the processor's hardware profiling support 16 to monitor data cache miss events during program execution. It configures the hardware to take samples of the data cache misses.

For each data cache miss sample, two pieces of information may be collected. The first collected piece of data is the instruction pointer address of the load instruction that misses the data cache. The second piece of information is the effective address of the memory location targeted by the load instruction. Once the hardware profiling support 16 is configured and started, it continuously monitors data cache miss events during program execution. The profile collector 10, which may reside in a Java virtual machine, is then executed periodically to retrieve the data cache miss samples from the hardware profiling support 16.

Once the profile collector 10 obtains data cache miss samples, it filters out samples that are not relevant to the object layout optimization. In object layout optimization, only data cache miss samples that originate from accessing Java objects may be of interest. Thus, to simplify the discussion, we can focus on load instructions that access managed Java objects that originate from Java code. However, the same techniques may also be applicable to Java objects accessed by native code as long as proper mapping information is provided to translate effective addresses into object types.

For each Java method, the just-in-time compiler compiles the Java byte code into native code before the method is executed. During the compilation of the method, the just-in-time compiler 14 generates a load instruction map that contains the instruction pointer addresses of all load instructions in the method and the object types and field offsets within the Java objects being accessed. The load instruction map is queried by the profile collector 10 to filter out irrelevant samples.

The profile collector 10 filters the collected data cache miss samples. It may discard samples whose instruction pointers are not in any load instruction map generated by the compiler 14 or whose effective addresses do not reside in the managed heap of the garbage collector 12. More filtering could be done in the delinquent type recognition step to discard samples on objects whose corresponding object types represent a portion of its overall cache miss samples that is too small to be of relevance. A managed heap may be allocated when the application starts and is managed by the garbage collector 12.

Before the garbage collector 12 starts its collecting cycle, it deduces delinquent types from the filtered data cache miss samples. The resulting delinquent type information is used in a later step (block 24) to adjust garbage collector object copying heuristics. Delinquent types are the object types of delinquent objects. To identify delinquent types, one should first identify delinquent objects by locating the virtual-method table (VTable) pointers of these objects. This can be done using the formula Address of the object's VTable Pointer equals the effective address of load target minus the offset, where effective address comes from the data cache miss sample and the offset is from the load instruction maps generated by the just-in-time compiler. The address of the object's corresponding VTable entry is stored as the first data field in the managed object structure.

The VTable entry pointed to by the object's VTable pointer is shared across all objects of the same type. The VTable entry contains important information about the object, including the size of the object, the offsets of the fields that contain references to other objects, and the class information of the object. The type information of an object may be identified through the object's VTable pointer. A delinquent object may also be further classified based on whether it is currently residing in the mature garbage collector's space or in a nursery garbage collector's space. This information may be used in a later step.

During the garbage collector's copying phase (block 26), live objects that reside in the nursery space are copied into the mature space. To improve the efficiency of managed object traversal, for each object type, the garbage collector 12 caches a list of field offsets in the object's corresponding VTable entry where the fields are of object reference type. The order of these field offsets in the list is predetermined when the object type is created and is fixed through the whole application's lifetime.

With the delinquent type profile constructed in the previous step, the list of field offsets is reordered so that those fields that refer to objects of delinquent types are on top of the list. The intended effect is to copy these delinquent objects early and together during the garbage collection copying phase, so that they are naturally relocated to memory locations that are closer together after the garbage collection copying phase. Another alternative is to reorder the offsets by taking into account both the delinquent types and object access order in the program. This approach may involve very elaborated compile time analysis in the just-in-time compiler 14.

The reordering algorithm may be illustrated with the following simple example. Assume a delinquent type has two fields, A and B. Field A points to a type $T_A$ object and field B points to a type $T_B$ object. If $T_A$ is a delinquent type and $T_B$ is not a delinquent type, the reference field list is ordered to put field A ahead of field B on the list. When both $T_A$ and $T_B$ are delinquent types, the reordering will put a field A ahead of a field B if the size of $T_A$ object is smaller than the size of $T_B$ object. In other cases, the original ordering of the fields A and B in the list remains unchanged.

To avoid disturbing the original program's data locality, field offset reordering may only be applied for those delinquent types that mostly happen in the mature space in one embodiment. If objects of the type $T_A$ incur most of the cache misses in the nursery space, then there would be no benefit to improve locality of type $T_A$'s instances in the mature space.

In a generational garbage collector, the garbage collection cycle is triggered when there is insufficient memory space in the nursery space. The garbage collector 12 identifies live objects in the nursery space and then copies these live objects to the mature space. The action of copying live objects from the nursery space to the mature space may be called the copying phase of garbage collection (block 26). Garbage collection generally traverses and copies live objects by following the current live object's reference field list described previously.

The traversal order adopted by the garbage collector in the copying phase may be breadth-first-search (BFS) order, depth-first-search (DFS) order, or hybrid of BFS and DFS order. When a live object of non-delinquent type is visited, the garbage collector traverses its field in the default DFS order in one embodiment. If the current visited live object is of a delinquent type, the garbage collector follows a DFS traversal order down all reachable objects of delinquent types in one embodiment. Reachable objects that are of non-delinquent types are queued for later traversal, resulting in a modified BFS order. Since the list of reference fields is already prepared, the DFS traversal order naturally leads to copying child objects of the delinquent types in a recursive manner. It may essentially move reachable objects of delinquent types right next to the current object. Using the traversal order, objects of affiliated types are placed contiguously, and objects that are of non-delinquent types need not be placed in between.

The interaction between different components of the virtual machine is shown in FIG. 1. The just-in-time compiler 14 first communicates (1) with the profile collector 10 to provide load instruction maps. The profile collector 10, in turn, communicates (2, 3) with the hardware profiling support 16 to configure the hardware for collecting data cache miss samples and to transfer the samples to the profile collector 10. The garbage collector 12 starts the garbage collection cycle and communicates (4) with profile collector 10 to ask for the filtered data cache miss profile. The profile collector 10 also communicates (5) with the garbage collector 12 to pass along the filtered data cache miss samples collected the garbage collector 12 has asked for. The sequence indicated by the numbers 1-5 is associated with the arrows shown in FIG. 1.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   using hardware profiling support to collect data cache miss profile;
   recognizing types of objects that create cache misses; and
   dynamically adjusting object copying heuristics during a copying phase of a generational garbage collector.

2. The method of claim 1 including using a just-in-time compiler to generate a load instruction map for a compiled method.

3. The method of claim 2 including using an instruction map to translate an instruction pointer address in data cache miss samples into objects and object types.

4. The method of claim 1 including collecting for each data cache miss sample, an instruction pointer address of the load instruction that misses the data cache and the effective address of the memory location targeted by the memory instruction.

5. The method of claim 1 including compiling a list of reference fields pointing to other objects inside an object type and reordering the list based on cache miss profile.

6. The method of claim 1 including reordering the list based both on object's cache miss profile and object access order.

7. The method of claim 1 including dynamically adapting a traversal order in a copying phase.

8. A virtual machine to implement dynamic optimizations for improving data caching comprising:
   a just-in-time compiler;
   a profile collector coupled to said just-in-time compiler, said profile collector coupled to receive hardware profiling support; and
   a garbage collector coupled to said profile collector, said profile collector to take samples of data cache misses, said just-in-time compiler to generate a load instruction map for each compiled method and said garbage collector to deduce types of objects from the cache miss samples and to adjust garbage collection object copying heuristics based on said types.

9. The machine of claim 8, said garbage collector to dynamically adjust object copying heuristics during a copying phase of generational garbage collection.

10. The machine of claim 9, said garbage collector to use an instruction map to translate an instruction pointer address in data cache miss samples into objects and object types.

11. The machine of claim 8, said profile collector to collect for each data cache miss sample an instruction pointer address of the load instruction that misses the data cache and the effective address of the memory location targeted by the memory instruction.

12. The machine of claim 11 wherein said profile collector is coupled to a performance monitoring unit.

13. The machine of claim 8 wherein said garbage collector to move objects from a first space to a second space during the copying phase of garbage collection.

14. The machine of claim 13 wherein said garbage collector to use a traversal order selected from the group including breadth-first-search, depth-first-search, or hybrid of breadth-first-search, and depth-first-search.

* * * * *